United States Patent Office 3,509,246
Patented Apr. 28, 1970

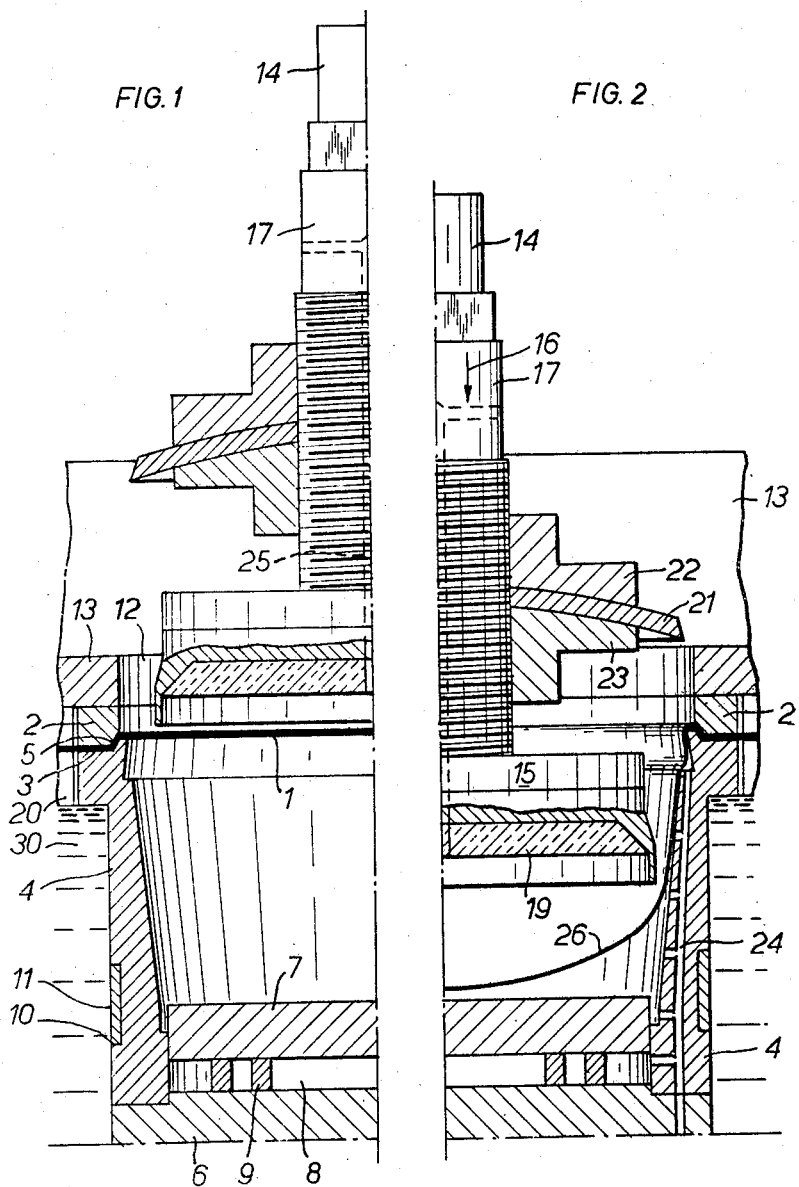

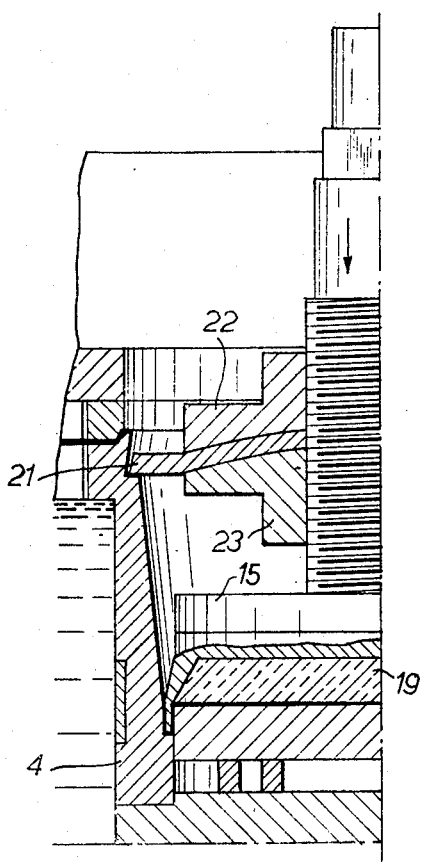
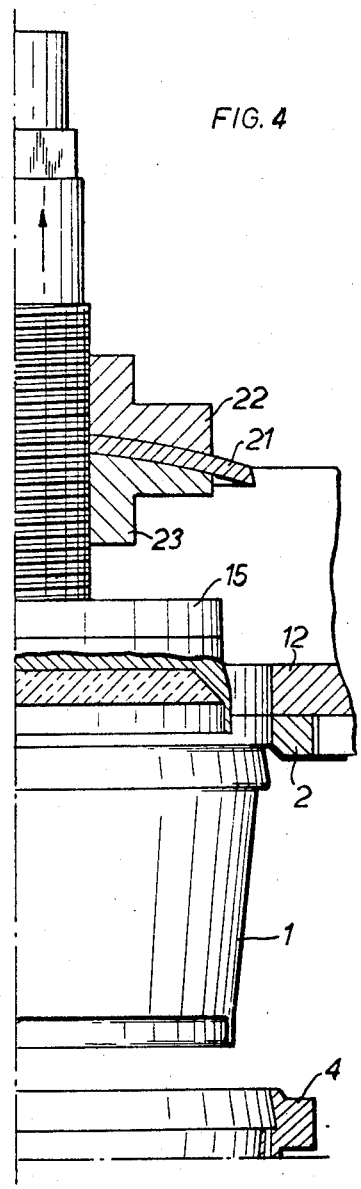

3,509,246
METHOD AND APPARATUS FOR DEEP-DRAWING HOLLOW-BOTTOM BEAKERS MADE OF PLASTICS SHEET
Detta Borgardt, Bremervorde, Germany, assignor to bebo-Plastik G.m.b.H.
Filed Nov. 30, 1967, Ser. No. 686,871
Int. Cl. B29c 17/03; B30b 7/00
U.S. Cl. 264—92          6 Claims

ABSTRACT OF THE DISCLOSURE

Apparatus for deep-drawing hollow-bottom beakers made of plastics sheet comprising a mold, means for cooling said mold, a cylindrical die, means for moving said die into and out of said mold, an annular groove in said mold corresponding in form to the base rim of the beaker to be molded, and a thin annular collar on said die slightly smaller in diameter than said annular groove.

---

The invention concerns a device for deep-drawing hollow-bottom beakers made from plastics sheet, by means of a vacuum in a cooled mold.

It has long been required to provide known deep-drawn plastics material beakers with a hollow bottom similar to paper beakers, as required for reasons of appearance and stability. The production of such beakers, however, encountered technical difficulties in form the very narrow rims required at the base of the beakers.

The present invention enables such a beaker to be made by means of an apparatus in which the mold has an annular groove around its base corresponding to the base rim of the beaker, and a die is provided, with a thin annular collar which penetrates into the annular groove of the mold.

According to a feature of the invention the base of the mold is cooled less than the remainder thereof. Cooling the mold as such is necessary since the deep-drawn sheet has to set in the shape imparted thereto before being removed from the mold. It is necessary for the cooling to be quite intense since the die stroke time is short and the period of time available for allowing the material to set is thus also short.

It has been found that a very thin beaker base rim may be obtained only if the material, which in this region is subjected to very high stresses during molding, is sufficiently plastic.

Screening of the base region of the beaker in the mold, which is otherwise encircled by cooling water, is conveniently effected by means of a thermally insulating layer.

It is preferable for the mold bottom to be separated from the cooled parts of the mold by the insulating layer, which may be a hollow space or cavity.

According to a further feature of the invention the die above the collar is reduced in diameter to provide an adequate clearance from the wall of the mold. In this region it does not act directly on the sheet to shape it, so that an excessively quick setting of the sheet material is avoided.

In accordance with the invention the mold has an outwardly projecting step close below its upper edge which co-operates with a spreading ram which in its inoperative position has a smaller inside diameter than the inside edge of the mold step and which, after encountering the step, expands elastically in a radial direction. This spreading ram is preferably formed as a curved plate made of elastic material, the concave side of which faces into the mold. In an alternative embodiment, provision is made for the spreading ram to comprise a soft elastic ring which in the working position in co-operation with the mold step is subject to a diameter increase into the space formed by the step, due to axial or radial outwardly directed pressure.

The invention is described in detail hereinafter with reference to the accompanying drawings which show a preferred embodiment of the invention.

In the four figures, each of which forms one-half of a longitudinal section of two sectional views, the apparatus is shown in four different working stages.

The part 1 of a continuous heated sheet to be deep-drawn is clamped between a clamp plate 2 and the upper surface 3 of a mold body 4. The clamp plate and mold body have co-operating shapes 5 to form the beaker collar.

The mold body 4 is closed at the bottom by a plate 6 which supports a mold bottom 7, there being a space 8 formed by means of spacers 9. In the side wall of the mold body 4 there is an annular groove 10. The base region of the mold is enclosed by a thermal insulating layer 11, made for example, of "Teflon," which screens this region from the cooling water 30 which surrounds the mold body on all sides.

Through an opening 12 in the holding down plate 2 and in the holding down member 13 supporting it a vertically displaceable die 15 moves along an axis 14 into the cavity of the mold body in the direction of the arrow 16. The underside of the die 15 is covered by a thermal insulating layer 19, made for example of "Teflon." This layer also helps to absorb the pressure which occurs when the die nears the mold plate 7.

The mold body has a flange 20 slightly above its upper edge which in co-operation with a spreading ram 21 serves to form a stacking edge on the beaker. The spreading ram 21 is formed by an elastic disc which is clamped between two nuts 22 and 23, and is of part-spherical form. The unclamped disc may be flat.

The clearance of the lower edge of the disc 21 from the underside of the die 15 is smaller by a lesser extent (for example 1 mm.) than the clearance between the step 20 and the bottom of the mold body 4. The spreading ram 21, however, is fixedly connected to the die 15 on the spindle 17.

Vacuum pipes 24 are formed at different levels and uniformly spread over the circumference of the mold wall and in flange 20. The space beneath the mold bottom 8 also communicates with the vacuum pipes. Through the spindle 17 a ventilating pipe 25 leads to the underside of the die 15.

The method of operation of the apparatus will now be described. An unmolded heated sheet 1 is placed between the clamp plate 2 and the mold body 4, which in FIGURE 4 appears in its lowered position. When the mold body is moved vertically upwards against the clamp plate, the rim collar as shown in FIGURE 1 is formed.

A vacuum is then formed in the interior of the mold, which draws the sheet into this cavity, as indicated by way of an intermediate stage at 26. Directly after this the die 15, as shown in FIGURE 2, is moved vertically downwards to its lowermost position as shown in FIGURE 3, in which the collar 18 has entered the annular groove 10, forming the beaker base. Shortly before the lowest point is reached, the spreading ram 21 encounters the sheet drawn by the vacuum into flange 20. As the ram descends it spreads and its diameter increases. Its outer edge enters into the step space, the sheet being drawn outwardly into the step shape forming an inversely conical, steep step relative to the conical shape of the remainder of the beaker, thus ensuring stackability of a pile of beakers. The spreading ram 21 is preferably made of "Teflon," since this material has a very low coefficient of abrasion and permits the ram to be in sliding engagement with the sheet material on flange 20 without causing damage.

FIGURE 4 shows the apparatus with the mold parts separated. The beaker can be readily removed from the die 15, since the cooling of the beaker base, though less than that of the other parts of the beaker, is adequate to allow the material to set sufficiently without causing it to adhere to the mold parts.

I claim:

1. A process for deep-drawing a beaker from plastics material sheet, comprising the steps of clamping said sheet between up and lower parts of a mold, applying a vacuum to the lower part of said mold so as to deep-draw said sheet, cooling the base of said mold, forming a hollow bottom on said beaker by depressing an upper part of the mold carrying an annular ram into engagement with a slot into the lower part of said mold, providing a cooling zone near said bottom part of said mold, heating the remainder of said mold from the exterior and providing a lip on the upper part of said beaker by using a flexible spreading ring fastened to the upper part of said ram, said spreading ring co-operating with a step in said mold to press said beaker material into said step.

2. Apparatus for deep-drawing hollow-bottom beakers made of plastics sheet, comprising a two-part mold, means for heating said mold round its sides, means for cooling the outer part of said mold near its base, a cylindrical die, means for moving said die into and out of said mold, an annular groove in said mold corresponding in form to the base rim of the beaker to be molded, a thin annular collar on said die slightly small in diameter than said annular groove, an outwardly projecting step on said mold just below its outer edge, a spreading ram on said die comprising a resilient rim, and means for engaging said spreading ram with said beaker material and said step during downward movement of said ram in order to expand said ring and press said beaker material into said step.

3. Apparatus as recited in claim 2, and further comprising an insulating and heat absorbing layer on the lower side of said ram and within said annular collar.

4. Apparatus as recited in claim 2, wherein said spreading ram consists of a part-spherical resilient washer clamped between nuts.

5. Apparatus as recited in claim 2, wherein the distance between the lower edge of said spreading ram and the lowermost edge of said drawing ram is smaller than the distance between the lower edge of the step of said drawing mold and its base.

6. Apparatus as recited in claim 2, wherein said spreading ram comprises a soft resilient ring so located that in the working position of said ram said ring increases in diameter due to an axially directed pressure derived from said die during said molding operation.

References Cited

UNITED STATES PATENTS

| | | |
|---|---|---|
| 3,074,110 | 1/1963 | Mard et al. |
| 3,115,677 | 12/1963 | Thiel. |
| 3,128,732 | 4/1964 | Paynter et al. |
| 3,218,379 | 11/1965 | Edwards. |
| 3,260,781 | 7/1966 | Lux et al. |
| 3,338,997 | 8/1967 | Tigner. |
| 3,341,895 | 9/1967 | Shelby. |
| 3,406,428 | 10/1968 | Brown. |

WILLIAM J. STEPHENSON, Primary Examiner

U.S. Cl. X.R.

18—19